(12) United States Patent
Jones

(10) Patent No.: US 6,547,156 B2
(45) Date of Patent: Apr. 15, 2003

(54) GANTRY MOUNTED SOAP HEATING SYSTEM

(75) Inventor: Allen S. Jones, Bay of Islands (NZ)

(73) Assignee: Delaware Capital Formation, Wilmington, DE (US)

( * ) Notice: Subject to any disclaimer, the term of this patent is extended or adjusted under 35 U.S.C. 154(b) by 13 days.

(21) Appl. No.: 09/848,929

(22) Filed: May 4, 2001

(65) Prior Publication Data

US 2002/0003178 A1 Jan. 10, 2002

Related U.S. Application Data

(60) Provisional application No. 60/203,234, filed on May 8, 2000.

(51) Int. Cl.$^7$ .............................. B05B 1/24; B05B 3/00
(52) U.S. Cl. ........................ 239/13; 239/135; 239/139; 239/210; 239/310; 239/318; 239/750; 239/751; 239/752; 134/56 R; 134/123
(58) Field of Search ............................. 239/10, 13, 128, 239/135, 139, 302, 303, 310, 318, 210, 750, 751, 752; 134/34, 45, 56 R, 57 R, 123, 181, 105–108; 118/323, 680

(56) References Cited

U.S. PATENT DOCUMENTS

| | | | |
|---|---|---|---|
| 2,699,792 A | * | 1/1955 | Fisher ...................... 134/56 R |
| 3,496,908 A | * | 2/1970 | Bernardi ..................... 239/751 |
| 4,034,203 A | | 7/1977 | Cooper |
| 4,141,374 A | * | 2/1979 | McMahan .................... 239/752 |
| 4,679,578 A | * | 7/1987 | Miller ......................... 134/123 |
| 5,016,662 A | * | 5/1991 | Crotts et al. ................. 134/123 |
| 5,040,485 A | | 8/1991 | Bailey et al. |
| 5,413,128 A | | 5/1995 | Butts |
| 6,372,053 B1 | * | 4/2002 | Belanger et al. ............ 239/750 |

FOREIGN PATENT DOCUMENTS

| | | |
|---|---|---|
| DE | 44 02 372 | 8/1995 |
| FR | 2 765 538 | 1/1999 |

\* cited by examiner

*Primary Examiner*—Steven J. Ganey
(74) *Attorney, Agent, or Firm*—Andrus, Sceales, Starke & Sawall, LLP

(57) ABSTRACT

A heating system for use with an automatic vehicle wash system used to wash a car positioned within a wash bay. The heating system of the present invention includes a heating unit mounted directly to an overhead gantry used to wash the vehicle positioned within the wash bay. The heating unit receives the supply of water with the desired chemical agent already mixed with the water. Upon receiving the mixed supply of water, the heating unit elevates the temperature of the water to a desired temperature. The heating unit is positioned on the overhead gantry such that the heated water from the heating unit travels a short distance prior to its actual application to a vehicle.

8 Claims, 4 Drawing Sheets

GANTRY MOUNTED SOAP HEATING SYSTEM

CROSS-REFERENCE TO RELATED APPLICATION

The present invention is related to and claims priority from U.S. Provisional Application No. 60/203,234 filed on May 8, 2000.

BACKGROUND OF THE INVENTION

The present invention relates to a soap heating system for a touchless in-bay automatic vehicle wash system. More specifically, the present invention relates to a soap heater that is mounted on an overhead gantry used to wash a vehicle positioned in a touchless in-bay automatic vehicle wash system.

In current in-bay automatic vehicle wash systems, a supply of concentrated chemical detergent is stored in a separate location from a water supply. During operation of the vehicle wash system, the water supply is heated by a heat source typically located behind a wall of a vehicle wash bay. The heated water passes through a chemical injection system at which time the chemical detergent is added to the heated water supply. Typically, the chemical injection system is also behind the wall of the wash bay.

After the chemical detergent has been injected into the hot water supply, the hot water supply including the injected chemical detergent passes through a hose up to the overhead gantry. The overhead gantry includes a spray arch manifold and top manifold for applying the heated water and chemical agents to the vehicle being washed.

A distinct drawback of the heating and detergent injection system described above is that the hot water, after the chemical has been injected, travels over a relatively long distance prior to its application to the vehicle. During the long travel time from the water heater to the vehicle, the heated water passes along an aluminum support frame for the overhead gantry which, during winter months, causes the water to lose a significant amount of heat prior to its application to a vehicle. Additionally, chemical detergent is injected at a low temperature relative to the heated supply water, such that the chemical detergent lowers the overall temperature of the hot water prior to application to the vehicle.

Therefore, it is an object of the present invention to provide a soap heating system that heats the combination of the supply water and chemical detergent almost immediately prior to application of the water and detergent to the vehicle. It is a further object of the invention to provide a heating unit that heats the soap and water without the heating element contacting the water including the chemical detergent.

SUMMARY OF THE INVENTION

The present invention relates to a gantry mounted heating system for use in a touchless in-bay automatic vehicle wash system. The heating system of the present invention includes a heating unit mounted to the movable overhead gantry of the in-bay vehicle washing system. The heating unit mounted to the moving overhead gantry receives the supply of water that already includes one or more concentrated chemical detergents inserted by a chemical injection system. The received water supply including the injected detergent is heated onboard the overhead gantry prior to its application to the vehicle by the application manifolds of the vehicle wash system.

The gantry mounted heating unit of the present invention includes a series of fluid passageways extending through an aluminum extrusion. The aluminum extrusion is in contact with an electric heating element such that the heat generated by the heating element is transferred from the heating element through the aluminum extrusion to the detergent and water contained within the internal fluid passageways. In this manner, the heating element does not come into direct contact with the corrosive chemicals contained within the water being applied to the vehicle.

The heating system of the present invention inserts one or more chemical detergents into room temperature water in a pump station located remotely from the overhead gantry used to wash the vehicle. After the concentrated chemical detergent has been inserted into the water supply by the chemical injection system, the combination of the chemical detergent and water is transferred to the overhead gantry heating unit by a fluid hose. While in the heating unit, the chemical detergent and water is heated to a desired temperature prior to its application to the vehicle. Since the heating unit is positioned near the application manifolds, little heat is lost prior to the heated detergent and water being applied to the vehicle.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
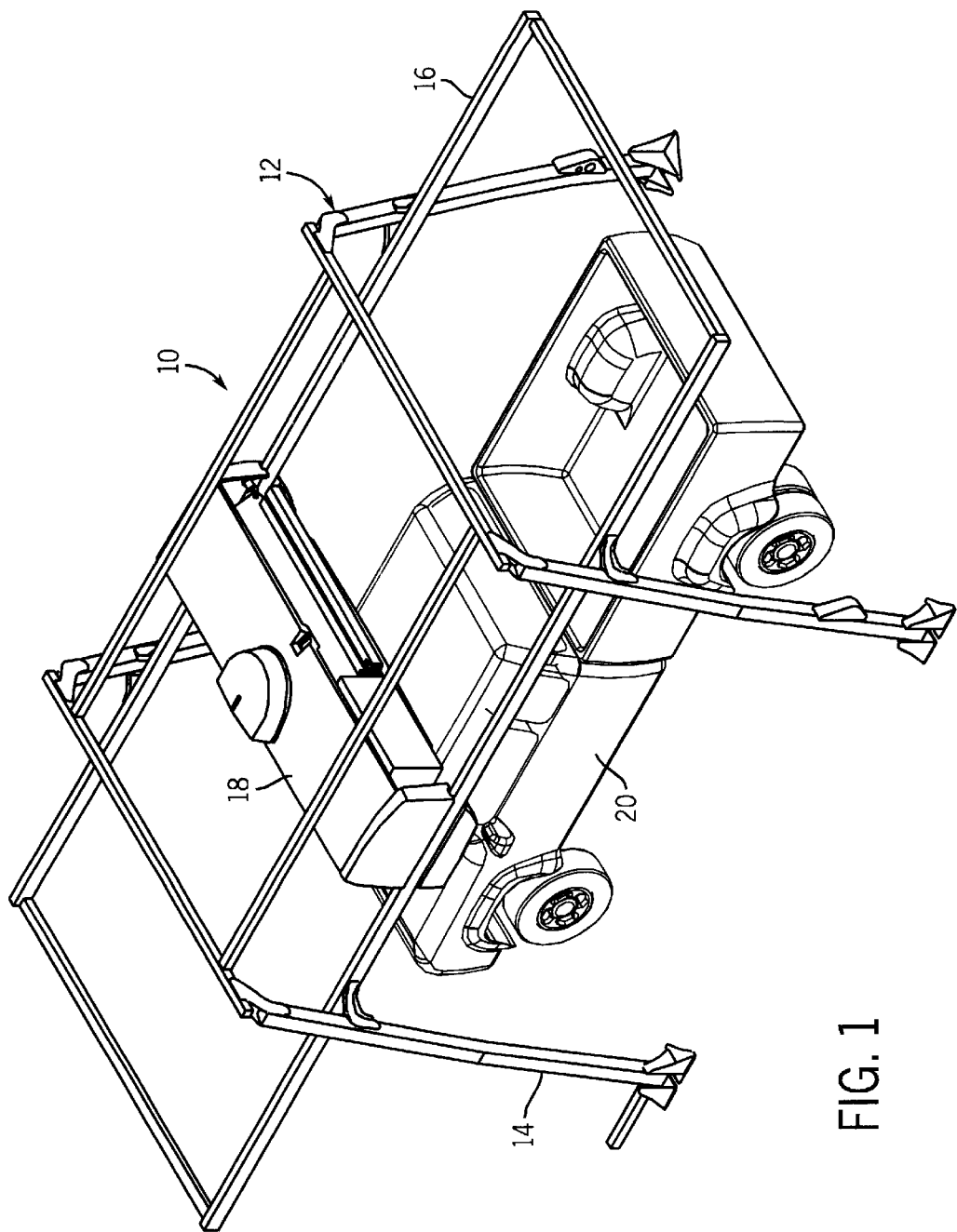
FIG. 1 is a perspective view illustrating a vehicle positioned within a touchless in-bay automatic vehicle wash system incorporating the gantry mounted heating system of the present invention.

Referring first to FIG. 1, there shown is a touchless in-bay automatic vehicle wash system 10. The vehicle wash system 10 includes a support frame 12 including four spaced uprights 14 that are positioned near the outer walls of the vehicle wash bay. The uprights 14 support a pair of spaced, parallel guide rails 16 that extend along the longitudinal length of the wash bay. The guide rails 16 support an overhead gantry 18 that is movable along the length of the guide rails 16. As can be seen in FIG. 1, the overhead gantry 18 is positioned above the vehicle 20 when the vehicle 20 is within the wash bay.

Figure 2:
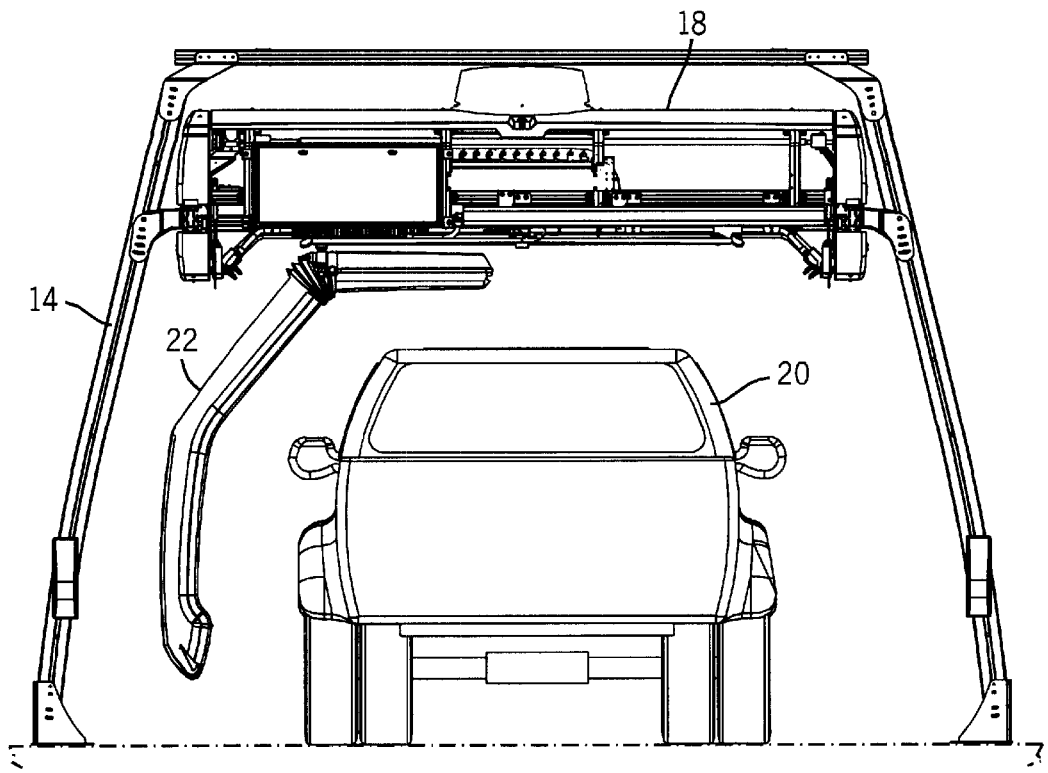
FIG. 2 is an end view of the vehicle positioned beneath the overhead gantry including the heating system of the present invention.

As can be seen in FIG. 2, the overhead gantry 18 includes a spray arch 22 extending beneath the overhead gantry 18. The spray arch 22 is mounted to a pivot mechanism such that the spray arch 22 can rotate relative to the overhead gantry 18. Additionally, the spray arch 22 is mounted to a drive mechanism such that the spray arch 22 can move laterally across the width of the wash bay during the operation of the vehicle wash system 10.

Figure 6:
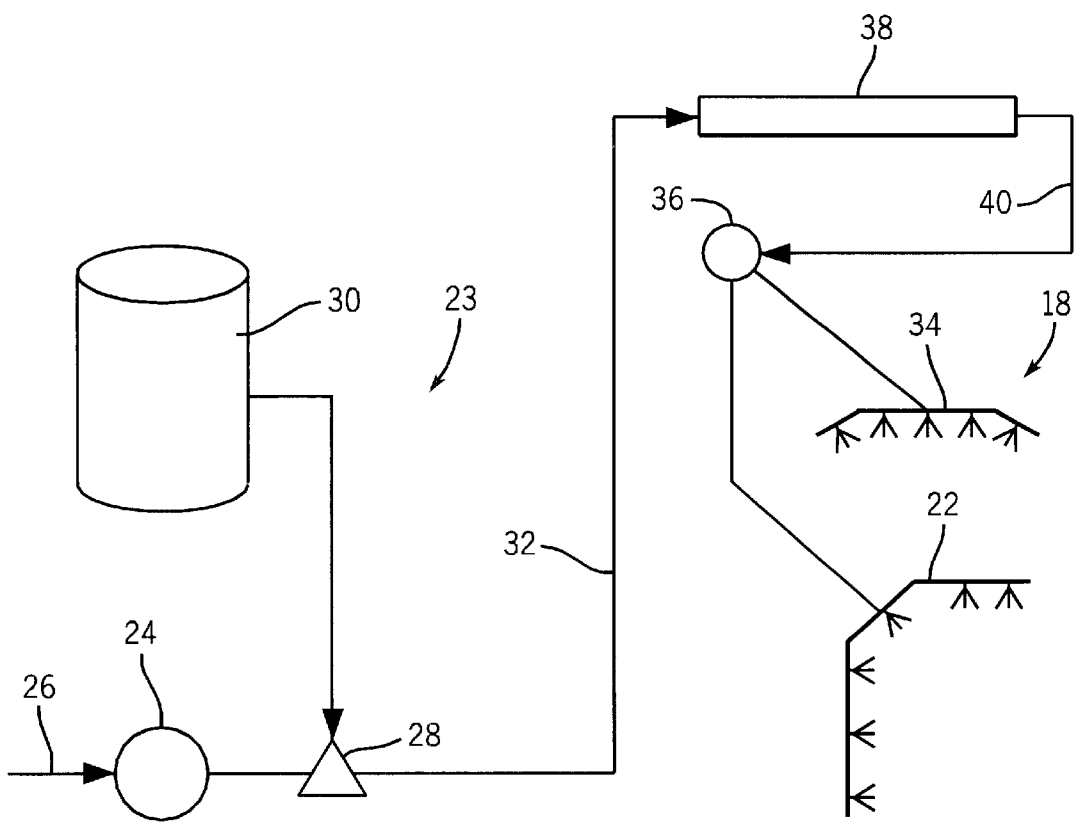
FIG. 6 is a schematic illustration of the gantry mounted heating system of the present invention.

Referring now to FIG. 6, there shown is a schematic illustration of the gantry mounted heating system of the present invention. The heating system generally includes a pumping station 23 that is positioned remotely from the wash bay in which the vehicle is currently being cleaned. For example, the pump station 23 may be located behind the wall of the wash bay and may serve more than one wash bay at a time.

The pump station 23 generally includes a pump 24 that receives a main supply of water from a supply line 26. The pump 24 directs the supply of water to a chemical injection system 28 that uses the Venturi effect to inject a concentrated detergent or other type of chemical agent into the water supply. In the embodiment of the invention illustrated in FIG. 1, the concentrated detergent is stored in a supply bin 30 that is located separate from the main water supply line 26. The operation of the chemical injection system 28 is controlled by a computer control unit (not shown) that is able to operate a series of valves to selectively control the type of chemical inserted into the main water supply.

Although only a single chemical supply bin 30 is illustrated in FIG. 6, is should be understood that multiple types of chemicals can be injected into the supply of water by the chemical injection system 28. During the washing cycle, various different chemicals can be sequentially injected into the supply water by the chemical injection system 28. For example, chemicals such as a wax, concentrated soap, rinsing agent or spot-free rinse chemical can be selectively inserted by the chemical injection system 28.

After the concentrated soap or chemical agent has been injected into the main water supply by the chemical injection system 28, the combination of the water supply and injected chemical agent is transported by a main supply line 32 to the overhead gantry 18 of the in-bay automatic vehicle wash system. As described previously, the overhead gantry is mounted for movement relative to the stationary vehicle such that the overhead gantry 18 can apply soap and rinse water to the vehicle within the wash bay.

Figure 3:
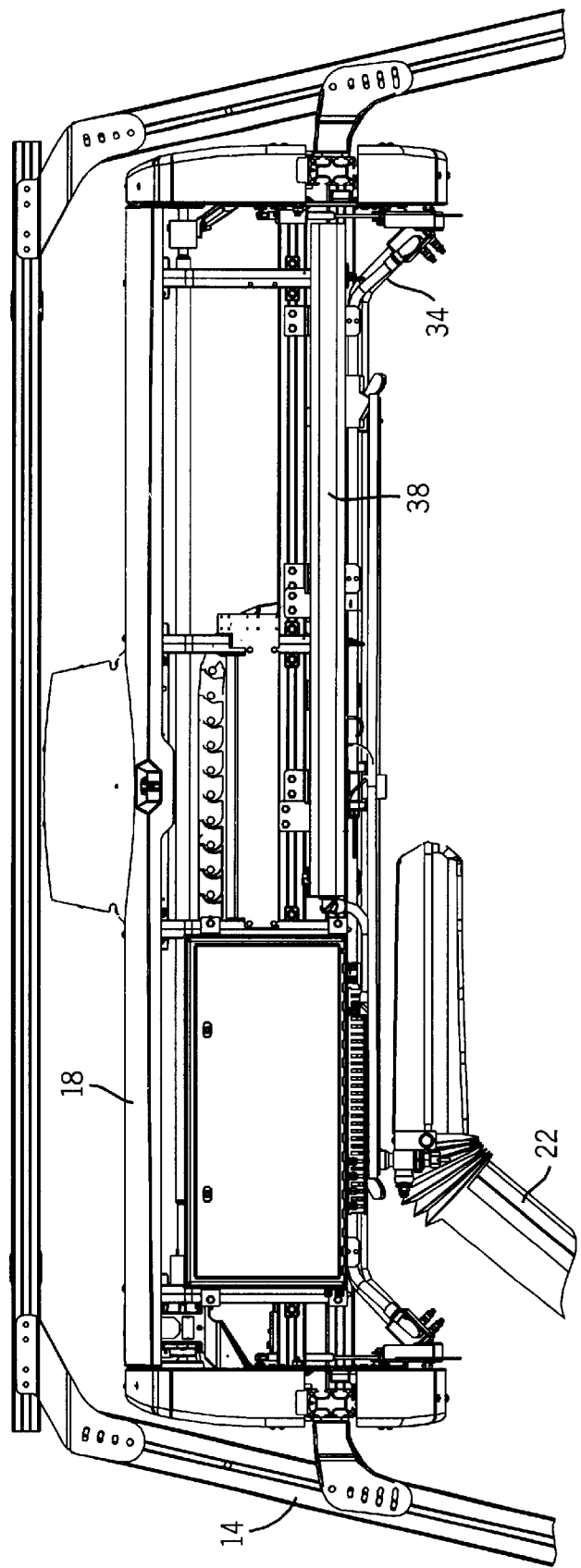
FIG. 3 is a magnified view illustrating the mounting of the heating system to the overhead gantry of the vehicle wash system.

As shown in FIGS. 3 and 6, the overhead gantry 18 includes a top productivity manifold 34 and the spray arch 22. The flow of water to both the top productivity manifold 34 and the spray arch 22 is controlled by a diverter valve 36 contained on the overhead gantry, as illustrated in FIG. 6. The diverter valve 36 is controlled by the control unit (not shown) of the vehicle wash system and allows the control unit to selectively supply water to either the top productivity manifold 34 or the spray arch 22, or both, depending upon the wash program initiated within the control unit. For example, the top productivity manifold 34 and the spray arch 22 can be used to apply soap to the vehicle individually or simultaneously while the spray arch 22 can then be later used to rinse soap and other chemicals from the vehicle.

Referring now to FIG. 6, the overhead gantry 18 also includes a heating unit 38 that is mounted to the overhead gantry and receives the combined supply of water and injected chemical prior to application of the water and chemical to the vehicle. The operation of the heating unit 38 is controlled by the control unit of the vehicle wash system and allows the chemical agent and water supply to be heated in an on-demand fashion, which increases the efficiency of the vehicle wash system.

Since the heating unit 38 is mounted onto the overhead gantry 18, the heated supply of soap and water leaves the heating unit 38 and travels through a hose 40 to the diverter valve 36, also mounted to the overhead gantry 18. From the diverter valve 36, the heated combination of soap and water travels a very short distance prior to its diversion to either the top productivity manifold 34 or the spray arch 22. The close proximity of the heating unit 38 and the application manifolds allows very little heat to be lost during the flow of the heated soap/water combination prior to its actual application to the vehicle. By mounting the heating unit 38 to the overhead gantry 18, a significant amount of electricity can be saved since there is a substantial decrease in the amount of heat lost as the water is transported from the heating unit 38 to the point of application to the vehicle.

Figure 4:
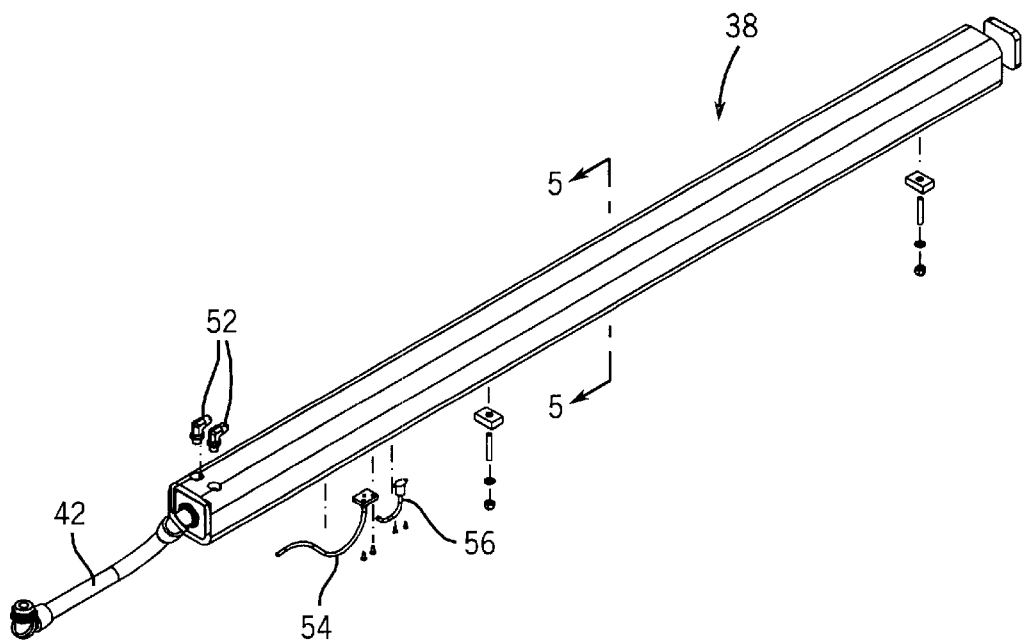
FIG. 4 is a perspective view illustrating the heating system of the present invention.
Figure 5:
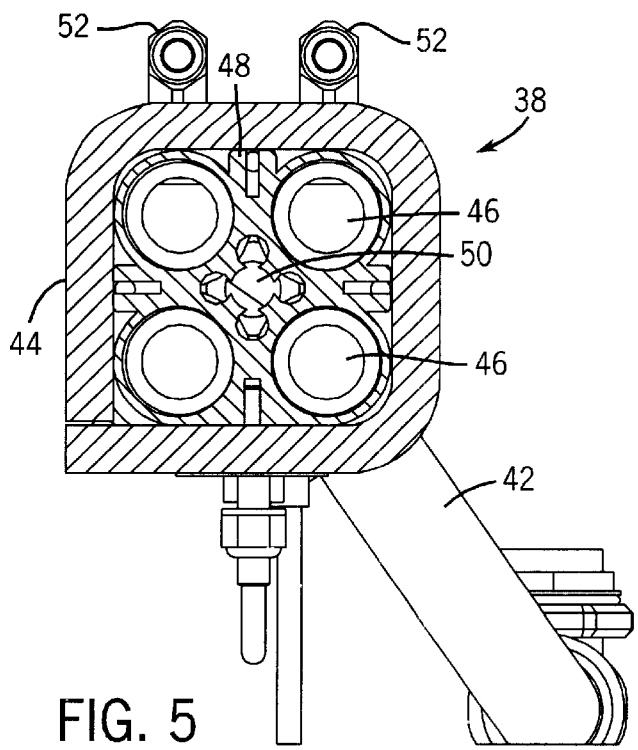
FIG. 5 is a section view taken along line 5—5 of FIG. 4.

Referring now to FIG. 4, there shown is the heating unit 38 used in the present invention. The heating unit 38 includes an inlet adapter 42 that receives the supply of water and chemical agent from the supply tube 32 shown in FIG. 6. Referring now to FIG. 5, the heating unit 38 includes an insulated outer covering 44 that surrounds a plurality of individual flow passageways 46 that receive the flow of water and chemical agent. Each of the flow passageways 46 are surrounded by an aluminum extrusion 48. The aluminum extrusion 48 is in contact with a central heating element 50 that is connected to a supply of electricity. The aluminum extrusion 48 transfers the heat from the heating element 50 to the water and chemical contained within each of the passageways 46. In this manner, the heating element 50 is completely separated from the chemical detergent contained within the water being heated. Therefore, the corrosive effects of the chemical detergent on the heating element 50 is eliminated by the heating unit 38 of the present invention.

Referring back to FIG. 4, heating unit 38 includes a pair of outlet adapters 52 that direct the supply of heated water to the diverter valve and ultimately to the top productivity manifold and spray arch of the overhead gantry. In the preferred embodiment of the invention, the heating unit 38 includes a temperature sensor 54 and an over-temperature cut-off 56. The heating system has an automatic over-temperature reset that automatically turns off the heating unit 38 if the temperature within the heating unit 38 exceeds an upper limit and automatically resets itself when the temperature decreases into a preset range. Since the heating unit is located a very short distance from the application manifolds, control of the actual temperature of the soap and water applied to the vehicle can be more accurately determined by using the heating unit of the present invention.

Since the heating unit 38 is positioned so near the actual application point of the chemical and heated water to the vehicle, the soap heating system includes software that allows the soap temperature to be set according to the wash system status. For example, the control of the heating element 50 can be determined based on whether the vehicle wash system is currently busy, slow or not seeing any vehicle traffic. This type of software allows for a more efficient operation and conservation of electricity.

Various alternatives and embodiments are contemplated as being within the scope of the following claims particularly pointing out and distinctly claiming the subject matter regarded as the invention.

I claim:

1. In a vehicle wash system having an overhead gantry movable above and along the length of a vehicle positioned within a wash bay, the overhead gantry including a spray arch for washing the vehicle as the overhead gantry moves along the length of the vehicle, the improvement comprising:

a chemical injection system for injecting a chemical agent into a supply of water; and a heating unit mounted to the overhead gantry for movement along with the overhead gantry, the heating unit being connected to the chemical injection system to receive the supply of water including the injected chemical agent, wherein the heating unit is operable to heat the supply of water and injected chemical agent prior to supplying the supply of water and injected chemical agent to the spray arch for application to the vehicle.

2. The improvement of claim 1 wherein the chemical injection system is positioned off of the overhead gantry.

3. The improvement of claim 1 wherein the heating unit includes a plurality of flow passageways that receive the supply of water and injected chemical, wherein the plurality of flow passageways are in contact with a heating element such that the heating element raises the temperature of the water within the flow passageways.

4. A vehicle wash system for washing a vehicle positioned within a wash bay, the vehicle wash system comprising:

an overhead gantry positioned above the vehicle and mounted for movement along the length of the vehicle;

a spray arch contained on the overhead gantry, the spray arch being operable to direct a supply of water onto the vehicle as the vehicle is being washed;

a chemical injection system operable to inject a chemical agent into a supply of water; and a heating unit mounted to the overhead gantry for receiving the supply of water including the injected chemical agent from the chemical injection system, wherein the heating unit is operable to heat the supply of water and injected chemical agent prior to the supply of water being applied to the vehicle by the spray arch.

5. The vehicle wash system of claim 4 further comprising a top production manifold mounted to the overhead gantry for applying the heated supply of water and injected chemical agent from the heating unit to the vehicle.

6. The vehicle wash system of claim 5 further comprising a distribution valve operatively positioned between the heating unit and the spray arch and top production manifold, wherein the distribution valve is operable to control the flow of heated water from the heating unit to the top production manifold and the spray arch.

7. A method of supplying water to a spray arch of a vehicle wash system, the spray arch being mounted to an overhead gantry movable above and along the length of a vehicle positioned in a wash bay, the method comprising the steps of:

injecting one or more chemical agent into a supply of water;

pumping the supply of water and injected chemical agent to the overhead gantry;

mounting a heating unit on the overhead gantry for movement with the overhead gantry;

heating the supply of water and injected chemical agent in the heating unit on board the overhead gantry; and supplying the heated water and injected chemical agent to the spray arch for application to the vehicle.

8. The method of claim 7 wherein the step of injecting one or more chemical agent includes providing a chemical injection system operable to inject the one or more chemical agents into the supply of water.

\* \* \* \* \*